United States Patent [19]
Oberle

[11] 3,809,126
[45] May 7, 1974

[54] COMBINED EMERGENCY STOP AND GOVERNOR VALVE FOR CONTROLLING FLUID FLOW TO A TURBO-MACHINE

[75] Inventor: Arthur Oberle, Ennetbaden, Switzerland

[73] Assignee: Brown Boveri & Company Limited, Baden, Switzerland

[22] Filed: Sept. 13, 1972

[21] Appl. No.: 288,547

[30] Foreign Application Priority Data
Sept. 24, 1971 Switzerland.................... 13888/71

[52] U.S. Cl......... 137/630.14, 137/613, 137/630.15
[51] Int. Cl............................................. F16k 1/00
[58] Field of Search........... 137/613, 630.14, 630.15

[56] References Cited
UNITED STATES PATENTS
1,166,884   1/1916   Bergo............................ 137/613 X
2,717,004   9/1955   Page............................. 137/613 X FOREIGN PATENTS OR APPLICATIONS
522,127   8/1953   Belgium........................... 137/613

Primary Examiner—Robert G. Nilson
Attorney, Agent, or Firm—Pierce, Scheffler & Parker

[57] ABSTRACT

A combined emergency stop and governor valve structure includes a valve housing which encloses a governor valve assembly actuated from one end of the housing and a stop valve assembly actuated from the opposite end of the housing. The governor valve includes a bell-shaped portion the end of which defines a valve seat, the emergency stop valve is operable within the bell-shaped portion of the governor valve and both valves are rigidly supported in all operation positions.

4 Claims, 1 Drawing Figure

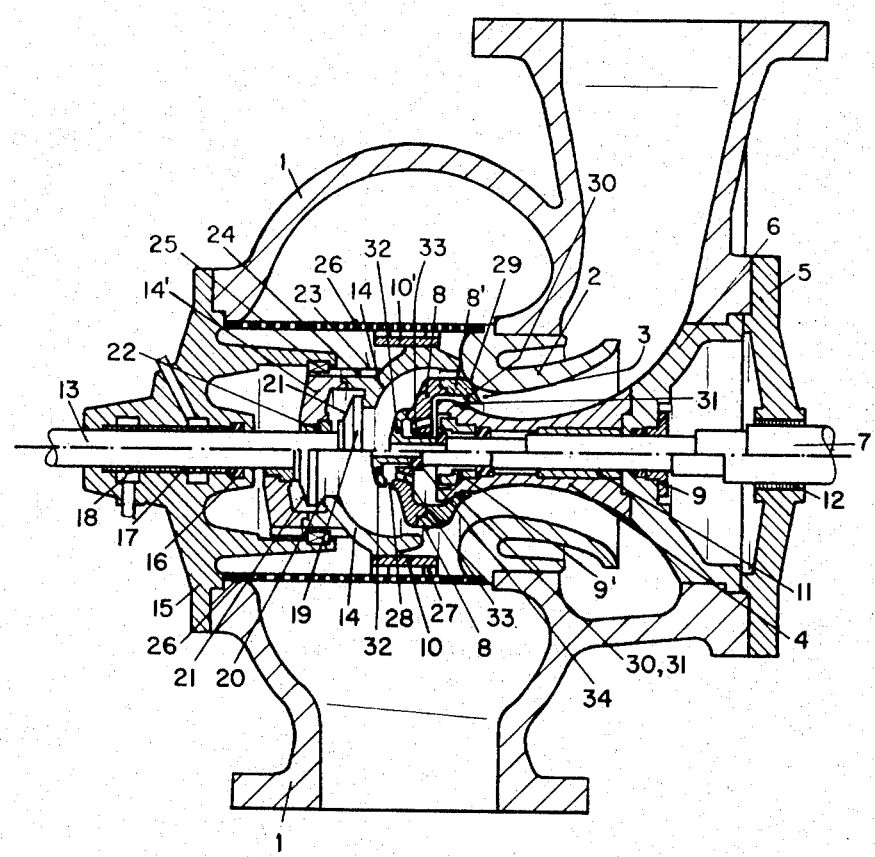

COMBINED EMERGENCY STOP AND GOVERNOR VALVE FOR CONTROLLING FLUID FLOW TO A TURBO-MACHINE

The present invention relates to an improved construction for a combined emergency stop and governor valve for mounting in pipes carrying the working medium of turbomachines, such that the emergency stop valve and governor valve are located independent of each other in a valve housing and are provided with coaxial valve seats next to each other and immediately adjacent to a flow aperture, the governor valve having the shape of a bell into the cavity of which the seat of the emergency stop valve projects coaxially.

In general the governor valves mounted in the pipes carrying the working medium of turbomachines, in particular of steam turbines, are always preceded by emergency stop valves so that, in the event of control failure or other external influences, at least emergency shutdown is possible, thus complying with the principle of double safety for the entire power station installation. It has also been customary for some time to mount interceptor valves in the reheat line of steam turbines with reheaters, since otherwise, following shutdown, despite the fact that the high-pressure section is sealed off, the volume of steam present in the reheater and the connecting pipe would be sufficient to accelerate the turbine to an inadmissibly high overspeed, which would endanger not only the turbine but also the entire power station installation. To prevent this effect, therefore, interceptor valves are mounted in the reheat line before the inlet to the section of the turbine following the reheater.

Interceptor valves are known which do not comprise two separate valve housings but whose governor valve and emergency stop valve are contained in a common valve housing. In this way advantage is taken of the reduced flow resistance resulting from a common valve seat for the emergency-stop part and governor part.

In a known variation, the governor valve is in the shape of a bell into the cavity of which the disc-shaped emergency stop valve projects during the opening movement. Here the valves are preferably so connected that the two valves, when in their extreme positions, are in the same position relative to each other.

During the course of power station development, it became a logical step, in the case of large steam volumes, to use valves of this form not only as interceptor valves, but also as live-steam governor valves. The purpose of the bell-shaped governor valve is then to modify the performance of the steam turbine in response to load variations.

It has been found, however, that under protracted partial-load conditions, i.e., with the governor valve in the throttled condition, this form of valve exhibits a tendency to vibrate, and its controlling ability is thus impaired. Damage due to wear and cyclic stress can result.

The principal object of the present invention is to eliminate the disadvantages mentioned and to afford a counter-measure against the diminished security.

This object is achieved in that both the governor valve and the emergency stop valve are rigidly supported with respect to the valve housing when the combined emergency stop and governor valve is in the fully open, closed or any intermediate position.

More particularly, the improved combined emergency stop and governor valve structure comprises a guide sleeve for the spindle of the emergency stop valve, such that the guide sleeve has a tapered seat by which the emergency stop valve, when in the open position, is supported and centered by means of a tapered surface, and the governor valve is provided with slides and guides which at each valve setting are guided in at least three radial planes by a centering ring connected to the valve housing.

The advantages of the invention lie in the fact that the spindle of the emergency stop valve is protected against direct impingement by the working medium and the spindle is consequently relieved of the effects of lateral forces due to the energy of the medium. Also, the spindle is rigidly held even in the open position, it being then subject only to axial compressive forces. The lateral forces still remaining are absorbed by the guide sleeve.

In a further variation, the guide sleeve of the emergency stop valve spindle forms the inside wall of an annular diffusor, the inlet opening of which is formed on one side by the emergency stop valve and on the other side by the valve cage, when the valve is in the open position. This has the advantage that not only is the area of the valve exposed to the flow decreased, but also flow losses are reduced.

A further feature is that the centering ring is located on a steam strainer rigidly fixed to the valve housing. The governor valve is thus guided essentially by a centering ring located in a radial plane, so that vibration phenomena at the governor valve are completely eliminated.

The invention will now be described in more detail with reference to the accompanying drawing, which shows an axial section through a preferred embodiment of the improved combined live-steam emergency stop and governor valve.

In the drawing, valve housing 1 contains valve cage 2 which, together with guide sleeve 4, forms an annular diffusor type outflow channel 3. On one side of valve housing 1 is a cover 5 with spindle guide 6, through which passes the spindle 7, hydraulically powered, for example, of the emergency stop valve 8. Glands 9, $9^1$ are provided to seal the spindle. Exact guidance is achieved by bearing sleeves 11 and 12 in guide sleeve 4 and in cover 5.

The valve spindle 13 of the governor valve 14 enters through the wall of valve housing 1 axially opposite to spindle 7, valve housing 1 being sealed by means of a plate 15. In addition to the gland 16 at the point where the spindle passes through plate 15, there is also a bearing 17 which comprises leakage-steam chambers 18.

Spindle 13 has at its end a disc-type seat 19, one face of which forms the ring-shaped seat 20 of pilot valve 21, while the other face forms the travel-limiting device of the pilot valve 21 and also initiates actuation of the governor valve 14.

Governor valve 14 is in the shape of a bell, the outer circumference 23 of barrel 22 being provided with slots 24 which provide guidance by engaging slides 25 fixed to plate 15.

Between valve cage 2 and plate 15 is a steam strainer 26, the periphery of which covers both valves 8 and 14. On the inner side of the tubular steam strainer 26 and within the range of movement of the governor valve is a guide 10 which laterally supports the bell-shaped governor valve 14. Guide 10 consists of at least 3 segments but can also, as in the present case, comprise a centering ring 10¹ which is rigidly joined to steam strainer 26 by means of arms 27. It would also be possible, however, to allow the rigid arms 27 to engage on valve cage 2, or be connected direct to valve housing 1.

The emergency stop valve 8 is formed by an end cap which for reasons of assembly is in two parts, the sealing strip 29 being on the outer circumference of plug piece 8¹, while the inner circumference of plug piece 8¹ has a tapered surface 30 corresponding to a tapered seat 31 on guide sleeve 4.

The guide sleeve 4 is shaped in accordance with the valve cage 2, which acts as a diffusor, and widens after the manner of a mushroom in the direction of the valve inlet. An annular diffusor channel 3 is thus formed together with valve 8 when the emergency stop valve is open.

A pilot valve 32 is mounted on valve spindle 7 of emergency stop valve 8. This pilot valve passes through the end cap of valve 8 and is provided with a common seat 28. Spindles 7 and 13 of the two valves 8 and 14, respectively, have a number of further seals which for reasons of clarity are not shown in the drawing.

The manner of operation will now be described, first with reference to the upper half of the drawing, which shows the two valves in the closed position.

When emergency stop valve 8 is closed, spindle 7 is drawn outwards by the auxiliary drives mentioned above, whereupon pilot valve 32 engages seat 28, and port 33 is sealed off. Spindle 7 then presses the sealing strip 29 of valve 8 against valve cage 2 and closes the flow aperture 3. Tapered surface 30 remains separated from tapered seat 31 so that spindle 7 is subjected to a continuous tensile load, the magnitude of which is determined by the servomotor referred to above. When governor valve 14 is closed, spindle 13, which is operated by the auxiliary drive, holds the pilot valve 21 closed by means of disc 19 which presses on sealing ring 20. The valve 14, guided by slides 25 and centering ring 27, is then moved in the direction of valve cage 2 until the valve seat is pressed against the valve cage. The procedure is reversed when the valves open, emergency stop valve 8 opening first. Spindle 7 is pushed into valve housing 1, whereupon pilot valve 32 opens first, allowing pressures in the cavity beneath valve cap 8 and the cavity of bell-shaped governor valve 14 to equalize by way of port 33. Valve 8 is then moved by thrust ring 34 until opposing surface 30 engages tapered seat 31. In this way valve 8 is rigidly attached to guide sleeve 4, spindle 7 being under purely compressive load. The load applied is determined by the force exerted by the servomotor minus the steam forces acting on valve 8.

Governor valve 14 opens in a similar manner. Pilot valve 19 opens first, and when pressure has equalized in the chambers the governor valve 14 can be moved to the desired control setting. The outside of governor valve 14 is then exposed to steam entering through strainer 26, so that flow oscillations could cause the governor valve to vibrate. The resulting lateral forces could cause damage to bearing 17 and spindle 13 itself. The same phenomena could affect emergency stop valve 8, causing damage to spindle 7 and bearings 11, 12.

However, lateral forces acting on the governor valve are absorbed by guide 10, and so spindle 13 is not subjected to these stresses. The situation with the emergency stop valve is very similar, except that it is sufficient to provide an adjustable fixing for the extreme position because the emergency stop valve does not have to assume a partially open position. The advantages of this lie in the simple protection from the steam flow because guide sleeve 4 projects into the bell-shaped chamber 14 of the governor valve when in the half-open position. On the other hand, spindle 7 cannot be subjected to lateral forces caused by vibration or oscillation because the spindle is protected on all sides by guide sleeve 4 and valve 8, and the direct flow outlet area is reduced. Only during the brief transition time between the extreme positions "open" and "closed" can lateral forces act on spindle 7, or, if the valve is horizontal, result from the inherent weight of valves 8 and 14, but the influence of these forces is negligible.

I claim:

1. A combined emergency stop valve and governor valve structure for mounting in pipes carrying a gaseous working medium comprising a valve housing, a governor valve assembly located within said valve housing which comprises a valve member including a bell-shaped portion the circular edge of which defines a valve seating surface engageable with a circular seat provided on a diffusor member located at the gas exit of said valve housing, guide means for said governor valve member, and a spindle extending through one end of said valve housing and said guide means for actuating said bell-shaped governor valve towards and away from said diffusor member; and an emergency stop valve assembly also located within said valve housing which comprises a stop valve member operable in the cavity established within the bell-shaped portion of said governor valve member, said stop valve member including an external circular seating surface engageable with a circular seat provided on said diffusor member, a second spindle extending through the opposite end of said valve housing for effecting actuation of said stop valve member towards and away from said diffusor member, and a guide sleeve for and surrounding said second spindle within said diffusor, said guide sleeve including an external circular tapered seat engageable with a complementary internal circular tapered seating surface on said stop member.

2. A combined emergency stop valve and governor valve structure as defined in claim 1 wherein said guide means for said governor valve member includes a barrel portion on said governor valve member slidable within said valve housing and a plurality of circumferentially spaced axially extending co-engaging guide means located respectively on said barrel portion and said valve housing, and which further includes ring means carried by said valve housing which surrounds and guides said bell-shaped portion of said governor valve member.

3. A combined emergency stop valve and governor valve structure as defined in claim 2 wherein said ring means carried by said valve housing and which surrounds and guides said bell-shaped portion of said governor valve member is axially segmented.

4. A combined emergency stop valve and governor valve structure as defined in claim 2 wherein said ring means which surrounds and guides said bell-shaped portion of said governor valve member is supported by a cylindrical strainer surrounding said stop and governor assembles and which is secured to said valve housing.

* * * * *